(No Model.)

F. B. FANNING.
HANDLE FOR BICYCLES.

No. 578,734. Patented Mar. 16, 1897.

WITNESSES
John Buckler,
M. A. Knowles.

INVENTOR
Fred B. Fanning,
BY
Edgar Tate & Co
ATTORNEYS.

UNITED STATES PATENT OFFICE.

FRED BROWN FANNING, OF NEWBURYPORT, MASSACHUSETTS.

HANDLE FOR BICYCLES.

SPECIFICATION forming part of Letters Patent No. 578,734, dated March 16, 1897.

Application filed July 30, 1896. Serial No. 601,005. (No model.)

*To all whom it may concern:*

Be it known that I, FRED BROWN FANNING, a citizen of the United States, and a resident of Newburyport, in the county of Essex and State of Massachusetts, have invented certain new and useful Improvements in Handles for Bicycles and Similar Vehicles, of which the following is a specification, reference being had to the accompanying drawings, forming a part thereof, in which similar numerals of reference indicate corresponding parts wherever found throughout both views.

This invention relates to the handles of bicycles and similar vehicles, and the object thereof is to provide a pneumatic pad, cushion, or covering for the handles of vehicles of this class, whereby the hands will not be overheated, which frequently occurs when solid handles are employed, a further object being to provide a pneumatic pad, cushion, or covering which will yield to the pressure of the hand and fingers and will not cause the latter to become cramped, and which will also prevent the jolting and jarring of the head and shoulders which is occasioned by the use of solid or ordinary handles, and which may be pulled on over the ordinary handles of a bicycle or similar vehicle and removed therefrom whenever desired.

The invention is fully disclosed in the following specification, of which the accompanying drawings form a part, in which—

Figure 1:
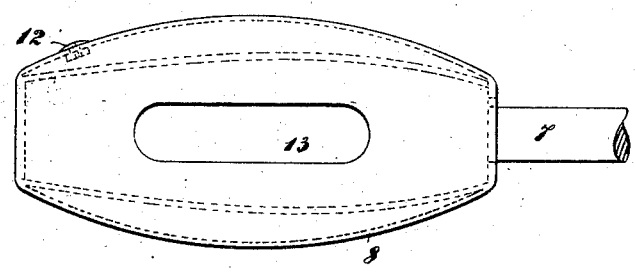
Figure 2:
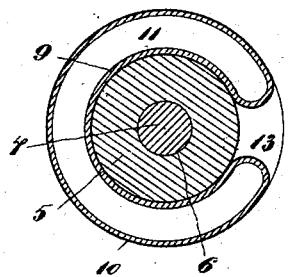

Figure 1 is a side view of my improved pneumatic pad, covering, or cushion applied to one of the handles of the bicycle; and Fig. 2, a central transverse section thereof.

In the practice of my invention I provide a pneumatic pad, cushion, or covering for the ordinary handles of a bicycle or similar vehicle, which consists of a central tubular part 9, which is inclosed by a casing 10, and the space 11 between the central tubular part 9 and the outer casing 10 is filled with air through a valve 12 of any suitable construction, and said space may be filled with air under a normal pressure or the air may be forced thereto under pressure by any suitable air-pump.

Formed in one side of the cushion, pad, or covering is an oblong opening 13, which is designed to permit of the proper expansion of the parts of the pad, cushion, or covering; but this opening is not absolutely essential and may or may not be employed.

The opening 13, as shown in Fig. 1, is formed one side of the pad, and the valve 12 is placed on the top thereof; but in practice I prefer to form the opening 13 in the bottom of the pad or cushion, and the valve 12 may be placed at one end thereof or in any desired position.

It will be understood that the space 11 is closed at each end and hermetically sealed where the ends of the central tubular part 9 connect with the outer casing 10, and said outer casing when inflated is larger at the center than at the ends and contracts gradually toward both ends, and is thus made to correspond with the form of the handles now usually employed. I have also shown at 7 a part of a handle-bar and at 5 the usual handle, and said handle is composed of wood, cork, or similar material, and is provided with a central bore 6, through which the end of the handle-bar passes.

The inner and outer parts of the pad, cushion, or covering of the tubular central portion 9 and the outer casing 10 may be composed of soft rubber or soft rubber in combination with any suitable fabric, or any other suitable material may be employed, but I prefer to employ material which possesses a certain amount of elasticity as well as flexible.

In practice the pneumatic pad, cushion, or covering is pulled on over the usual handle, the material of which it is composed yielding to permit of this operation, and said pad, cushion, or covering may be removed from the handle by reversing this operation whenever desired.

My invention is not limited to the exact form of the pad, cushion, or covering, nor to the form of the handle with which it is connected, as it is evident that changes in and modifications of the construction of these parts may be made without departing from the spirit of my invention or sacrificing its advantages.

Having fully described my invention, I claim as new and desire to secure by Letters Patent—

A pneumatic pad, covering or cushion for the handles of bicycles and similar vehicles, which consists of a central tubular part and of an outer casing which is connected with said tubular part at each end, whereby a space between said outer casing and said tubular part is formed, which is adapted to be filled with air, said central tubular part and said outer casing being composed of flexible material, said pad, cushion or covering being provided in one side thereof with an oblong opening and said outer casing being provided with an air-valve through which said space may be filled with air, substantially as shown and described.

In testimony that I claim the foregoing as my invention I have signed my name, in presence of the subscribing witnesses, this 27th day of July, 1896.

FRED BROWN FANNING.

Witnesses:
EDWARD E. VARINA,
DANIEL BALCH.